US006959181B2

(12) United States Patent
Maruyama et al.

(10) Patent No.: US 6,959,181 B2
(45) Date of Patent: Oct. 25, 2005

(54) TRANSMITTER DEVICE HAVING MEANS FOR AUTOMATICALLY TRANSMITTING DATA REMAINING THEREIN UPON ITS RE-ACTIVATION

(75) Inventors: Terutaka Maruyama, Toyota (JP); Akihiro Sasaki, Anjo (JP); Takashi Harada, Hekinan (JP)

(73) Assignee: Denso Corporation, Kariya (JP)

( * ) Notice: Subject to any disclaimer, the term of this patent is extended or adjusted under 35 U.S.C. 154(b) by 564 days.

(21) Appl. No.: 10/259,657

(22) Filed: Sep. 30, 2002

(65) Prior Publication Data

US 2003/0104847 A1 Jun. 5, 2003

(30) Foreign Application Priority Data

Nov. 30, 2001 (JP) .............................. 2001-366924

(51) Int. Cl.[7] .............................................. H04Q 7/20
(52) U.S. Cl. .................... 455/343.5; 455/572; 455/69; 455/343.2; 455/343.6; 455/96; 455/99; 180/167; 180/313
(58) Field of Search ................... 455/343.5, 343.6, 455/343.1, 343.2, 343.3, 343.4, 572, 573, 455/69, 95, 99, 899; 180/167, 313

(56) References Cited

U.S. PATENT DOCUMENTS

| 5,798,688 A | * | 8/1998 | Schofield ..................... 340/438 |
| 6,043,752 A | * | 3/2000 | Hisada et al. ............... 340/5.26 |
| 6,163,271 A | * | 12/2000 | Yoshizawa et al. ........ 340/5.26 |
| 6,169,944 B1 | | 1/2001 | Hayasaka |

FOREIGN PATENT DOCUMENTS

| JP | A-5-160866 | 6/1996 |
| JP | A-2000-87614 | 3/2000 |

* cited by examiner

*Primary Examiner*—Nick Corsaro
*Assistant Examiner*—Shaima Q. Aminzay
(74) *Attorney, Agent, or Firm*—Posz Law Group, PLC

(57) ABSTRACT

Data formulated according to a user's request signal is transmitted from a transmitter device to a receiver device under a wireless or a wired system. The transmitter device includes a transmission controller that formulates the data to be transmitted and memorizes the request signal as a backup signal. If the data transmission is not completed due to a power source trouble such as a voltage drop, the data to be transmitted is automatically formulated again based on the backup signal and sent out to the receiver. If the data transmission is successful, the backup signal is eliminated from a memory. Thus, the data requested by the user is transmitted without fail even if the transmitter becomes temporarily inoperative.

6 Claims, 2 Drawing Sheets

TRANSMITTER DEVICE HAVING MEANS FOR AUTOMATICALLY TRANSMITTING DATA REMAINING THEREIN UPON ITS RE-ACTIVATION

CROSS-REFERENCE TO RELATED APPLICATION

This application is based upon and claims benefit of priority of Japanese Patent Application No. 2001-366924 filed on Nov. 30, 2001, the content of which is incorporated herein by reference.

BACKGROUND OF THE INVENTION

1. Field of the Invention

The present invention relates to a transmitter device that formulates data upon receipt of a request signal and transmits the formulated data to a receiver device via a wireless system or a wired system.

2. Description of Related Art

There are various transmitter devices that are activated by a battery and transmit data formulated according to a request signal via a wireless or wired system. One example is a transmitter device for use in a keyless entry system for an automotive vehicle. The transmitter device of the keyless entry system is powered by a battery and wirelessly transmits a locking or an unlocking signal to an on-board receiver. Another example is an on-board transmitter powered by an on-board battery for performing wired communication with various automotive electronic devices. Yet another example is a so-called remote controller used in home appliances such as a television set.

In those transmitter devices, there is a situation where power supply to the transmitter device is temporarily disconnected by an outside force applied thereto by a user, or a situation where a power source voltage temporarily drops due to heavy power consumption by other electrical loads. To cope with such a temporary power supply trouble, a large capacitor for storing power is usually used in a transmitter device.

The power-storing capacitor, however, cannot cope with a power supply trouble that lasts a considerable period of time. If the power source voltage drops to a certain level, incorrect data may be transmitted. In many conventional transmitter devices, operation of a transmission controller is stopped when the power source voltage drops to a predetermined level, and its operation is restarted upon recovery of the power source voltage. Therefore, data transmission may be discontinued in its middle. If this happens in the remote controller, an appliance cannot be operated in response to a request signal inputted by a user.

Though this kind of power source troubles may be avoided to a certain degree by increasing a capacity of a power-storing capacitor, the large capacitor requires a large space in the transmitter thereby making the transmitter bulky and costly.

SUMMARY OF THE INVENTION

The present invention has been made in view of the above-mentioned problem, and an object of the present invention is to provide an improved transmitter device that is able to automatically transmit data, transmission of which has not been completed due to a power source trouble, when the transmitter is reactivated upon recovery of the power source.

Data formulated based on a user's request is transmitted from a transmitter device to a receiver device under a wireless of a wired system. For example, the transmitter device is used in a keyless entry system of an automotive vehicle, in which a door of an automobile is wirelessly locked or unlocked according to a user's request signal inputted to the transmitter device. The transmitter device is powered by a power source such as a battery, a voltage level of which is not always stable.

The transmitter device includes a transmission controller having a memory device. The controller formulates data to be transmitted based on a request signal inputted by a user. At the same time, a signal backing up the request signal (a backup request signal) is memorized in the memory device so that data to be transmitted can be formulated again based on the backup request signal if data transmission is not completed due to a power source trouble such as a voltage drop. If the formulated data is successfully transmitted, the backup request signal is eliminated from the memory device. If the data transmission is not completed due to the voltage drop in the power source or the like, the data to be transmitted is formulated based on the memorized backup request signal when the transmitter device is reactivated upon recovery of the power source voltage.

In this manner, the data, transmission of which is not completed, can be automatically formulated again based on the backup request signal and transmitted to the receiver device. Thus, the data formed according to the user's request is transmitted without fail even if the transmitter device becomes temporarily inoperative. If a new request signal is inputted upon the reactivation of the transmitter device, data to be transmitted is formulated based on the new request signal to follow a newest user's request, neglecting the memorized backup signal.

When plural request signals are sequentially inputted to the transmitter device, only a newest request may be memorized in the memory device thereby to handle the newest user's request with priority. Formulation of the data based on the same backup request signal may be restricted to a certain number of times thereby to avoid transmitting data which does not meet a present intention of the user. Alternatively, a period of time lapsed from a previous data formation based on the backup request signal may be restricted to a certain time period for the same reason.

According to the present invention, data requested by a user is transmitted without fail even if the transmitter device becomes temporarily inoperative due to a power source trouble such as a voltage drop.

Other objects and features of the present invention will become more readily apparent from a better understanding of the preferred embodiment described below with reference to the following drawings.

DETAILED DESCRIPTION OF THE PREFERRED EMBODIMENT

Figure 1:
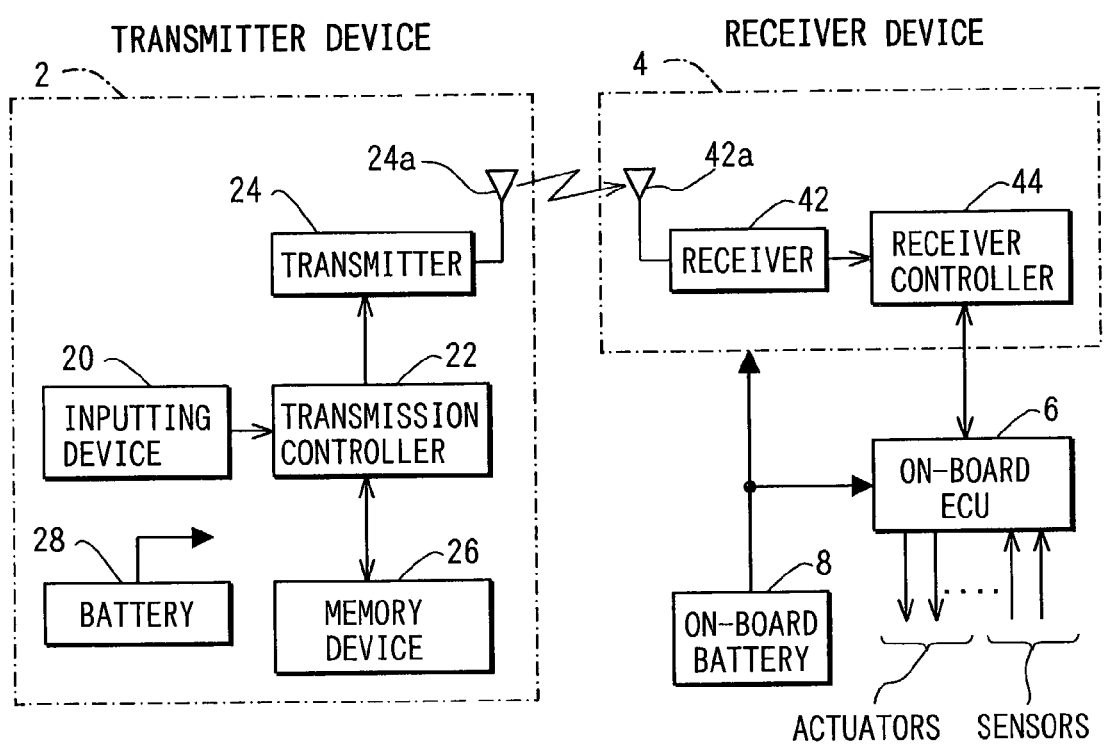
FIG. 1 is a block diagram showing an entire keyless entry system for use in an automotive vehicle.

A preferred embodiment of the present invention will be described with reference to accompanying drawings. The present invention is applied to a transmitter device used in a keyless entry system of an automotive vehicle. A door of an automotive vehicle is locked or unlocked by operating a portable wireless transmitter device carried by a user. The transmitter device functions as a remote controller. First, referring to FIG. 1, the entire keyless entry system will be described. The system is composed of a portable transmitter device 2, a receiver device 4 mounted on the vehicle and an on-board electronic control unit (ECU) 6 for controlling operation of body equipment including a door lock. The receiver device 4 and the ECU 6 are powered by an on-board battery 8.

The transmitter device 2 includes an inputting device 20 to which a user inputs a request signal to lock or unlock the door; a transmission controller 22 for formulating data to be transmitted based on the request signal; a transmitter 24 for wirelessly transmitting the formulated data to the receiver device 4 through a transmission antenna 24a; and a battery 28 for supplying power to components in the transmitter device.

The transmission controller 22 is composed of a microcomputer including memories such as ROM and RAM. The transmission controller 22 performs its function shown in FIG. 2 (explained later) when a power source voltage is higher than a predetermined level and stops its operation when the power source voltage becomes lower than the predetermined level. When the power source voltage recovers the predetermined level, the transmission controller 22 resumes its operation. The transmission controller 22 includes a memory device 26 that is able to keep memories therein even when the power supply is discontinued. The memory device 26 is composed of an EEPROM, for example.

The on-board receiver 4 includes a receiving antenna 42a, a receiver 42 and a receiver controller 44 mainly composed of a microcomputer. The data transmitted from the transmitter device 2 is received by the receiving antenna 42a and fed to the receiver 42 that decodes the received data and identifies the data as data sent from the transmitter 2 based on an ID code included in the decoded data. If the received data indicates a request for locking or unlocking the door, the receiver controller 44 sends a signal corresponding to such a request to the on-board ECU 6. The on-board ECU 6 drives a door lock actuator connected thereto thereby to lock or unlock the door. Thus, the door is locked or unlocked according to the user's request inputted to the inputting device 20 of the transmitter device 2.

Figure 2:
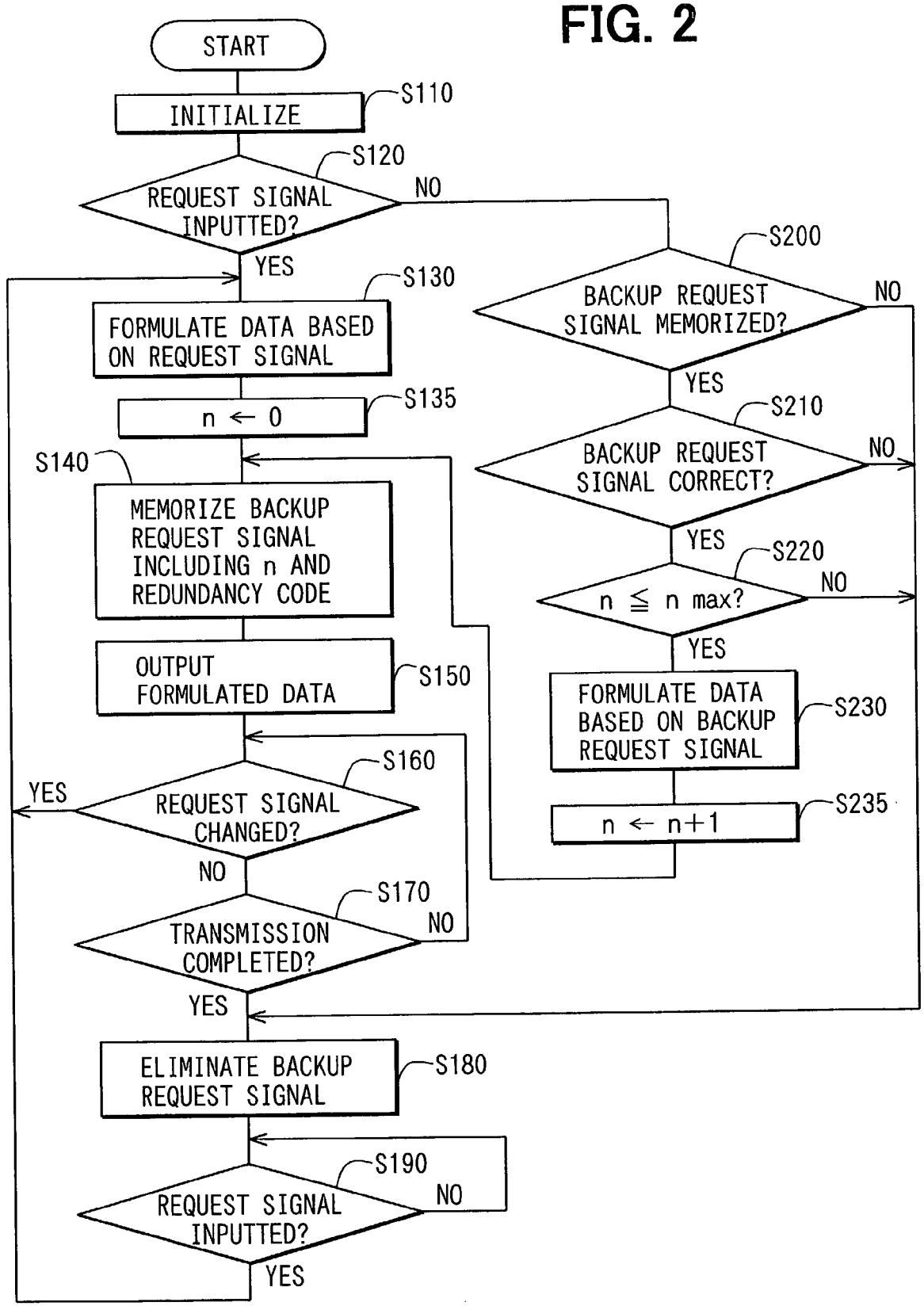
FIG. 2 is a flowchart showing a process performed in a transmitter device used in the system shown in FIG. 1.

A control process performed in the transmission controller 22 of the transmitter device 2 will be described with reference to the flowchart shown in FIG. 2. Upon starting the operation of the transmission controller 22, at step S110, resistors or the like included in the transmission controller 22 are initialized. Then, at step S120, whether any request signal (more particularly, a request signal for locking or unlocking the door) is inputted to the inputting device 20 is determined. If such a request is made, the process moves to step S130, where data corresponding to the request is formulated. Then, at step S135, a number n showing how many times the data corresponding to the request signal has been formulated (referred to as a repetition number n) is set to an initial value "zero."

Then, the process moves to step S140, where a redundancy code (e.g., a check-sum) for checking correctness of the request signal is calculated, and a backup request signal is formulated by adding the calculated redundancy code and the repetition number n to the request signal. The backup request signal is memorized in the memory device 26. If another backup request signal has been already memorized in the memory device 26, such another backup request signal is eliminated and only the newly formulated backup request signal is memorized.

Then, at step S150, the data formulated at step S130 is fed to the transmitter 24 thereby to transmit the data to the receiver device 4. Then, at step S160, whether any other request signal is inputted to the inputting device 20 after the data transmission is initiated is checked. If it is determined that another request is made, the process returns to step S130. If not, the process proceeds to step S170, where whether the data transmission has been completed or not is determined. If it is determined that the data transmission has been completed, the process proceeds to step S180, where the backup request signal memorized at step S140 is eliminated from the memory device 26. Then, process moves to step S190, where whether a new request signal is fed to the inputting device 20 is checked, in the same manner as in step S120. The process stays at step S190 until a new request signal is inputted and returns to step S130 to repeat the above-described steps when a new request signal is inputted.

On the other hand, if it is determined at step S120 that no request signal is inputted, the process moves to step S200. At step S200, whether the backup request signal is memorized in the memory device 26 is determined. If the backup request signal is memorized, the process proceeds to step S210, where the backup request signal is read out from the memory device 26, and whether the backup request signal is normal (correct) or not is determined using the redundancy code included in the backup request signal. If the backup request signal is normal, the process proceeds to step S220, where whether the repetition number n included in the backup request signal does not exceed a predetermined maximum repetition number $n_{max}$ (e.g., $n_{max}$=3) is determined. If it is determined that the repetition number n does not exceed the predetermined maximum repetition number $n_{max}$, the process proceeds to step S230, where data to be transmitted is formulated based on the backup request signal. Alternatively, a time period lapsed from a previous formulation of the data may be compared with a predetermined time period in step S220. If the time period is shorter than the predetermined time period, the process proceeds to the next step S230. Then, at step S235, the repetition number n is incremented by one (n+1). Then, the process moves to step S140 to perform the step 140 and the steps following step 140.

If any one of the determinations made at steps S200, S210 and S220 is negative (i.e., no backup request signal is memorized, or the memorized backup request signal is not normal, or the repetition number n is larger than the predetermined maximum repetition number $n_{max}$), the process moves to step S180, where the backup request signal, if any, is eliminated from the memory device 26. Then, the process moves to step S190.

The above-described process performed in the transmission controller 22 will be summarized. A user of the keyless entry system inputs a request signal for locking or unlocking the door to the inputting device 20. The transmission controller 22 formulates data to be transmitted based on the inputted request signal, and the formulated data is transmitted. At the same time, a signal backing up the request signal is formulated by adding the repetition number n and the redundancy code to the original request signal. The backup request signal is memorized in the memory device 26. After transmission of the formulated data is completed, the memorized backup request signal is eliminated from the memory device 26.

On the other hand, if no request signal is inputted when the transmission controller 22 is activated, and if the backup request signal is memorized, the data to be transmitted is formulated based on the memorized backup request signal. The data formulated based on the backup request signal, transmission of which has not been completed yet, is automatically transmitted.

Advantages of the present invention described above will be summarized. If the data transmission is discontinued or not completed due to a temporary voltage drop in the power source for any reason, the data that has not been transmitted is automatically transmitted when the transmitter device is reactivated upon recovery of the power source voltage. Therefore, the data to be transmitted according to the user's request can be transmitted without fail. In the case of the keyless entry system, it is avoided that the door lock is not operated even though user has so requested.

Immediately after the transmitter device is activated or reactivated, whether a user's request signal is being inputted or not is checked. If a request signal is newly inputted, the data to be transmitted is formulated based on that request signal regardless of whether or not a backup request signal is memorized in the memory device. If a request signal is not inputted at that time, the data to be transmitted is formulated based the newest backup request signal memorized in the memory device 26, because the transmission controller 22 is designed to memorize only the newest request signal. Therefore, transmission of the data that does not meet a present intention of the user is avoided. More particularly, the door is not locked or unlocked against the user's intention.

When the transmission controller 22 is repeatedly turned on and off due to a power source trouble, and the data transmission cannot be completed, the number of such failed transmissions (the repetition number n) is counted and memorized. If the repetition number n exceeds a predetermined number $n_{max}$ (e.g., $n_{max}=3$), the transmission of the data is not repeated any more and the backup request signal is eliminated from the memory device. Therefore, it is avoided to transmit the data based on a previous request which does not meet a present intention of the user. A time period lapsed from a previous failed transmission may be set in place of the repetition number for the same purpose.

The present invention is not limited to the embodiment described above, but it may be variously modified. For example, the present invention is applicable to remote controllers for operating various home appliances. Further, the present invention is also applicable to devices, such as electronic control units for use in an automobile, which are powered by a power source having a relatively unstable voltage and communicate with other devices under a wired or a wireless system. In those devices, it may be possible to store in the memory device all the previous request signals, the data of which have not been successfully transmitted, and to transmit all such data when the device is reactivated. The repetition number n may not be limited, instead, the data not transmitted may be repeatedly sent out.

The memory device 26 is not limited to the EEPROM. A RAM may be used in place of the EEPROM to reduce power consumption and to shorten a time for writing. When the RAM is used, memories therein are automatically erased within a few seconds, thereby avoiding keeping unnecessary backup request signals for a long time.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A transmitter device comprising:
   a power source for activating the transmitter device;
   input means for inputting a request signal;
   first control means formulating data to be transmitted based on the request signal, the first control means including a memory device which is able to memorize the request signal therein as a backup request signal even when a power source becomes unable to activate the transmitter device, the first control means eliminating the backup signal from the memory device upon completion of transmission of the data;
   second control means for formulating the data to be transmitted based on the backup request signal upon reactivation of the transmitter device if the backup request signal is still memorized in the memory device; and
   means for transmitting the data formulated in the first control means and in the second control means.

2. The transmitter device as in claim 1, wherein:
   the first control means memorizes only a newest request signal as the backup request signal in the memory device if a plurality of request signals are sequentially inputted.

3. The transmitter device as in claim 2, wherein:
   the second control means detects whether a new request signal is being inputted from the input means upon reactivation of the transmitter device; and
   the second control means formulates the data to be transmitted based on the new request signal if the new request signal is being inputted, and formulates the data to be transmitted based on the backup request signal if the new request signal is not being inputted and if the backup request signal is memorized in the memory device.

4. The transmitter device as in claim 3, wherein:
   under a situation where the second control means formulates the data to be transmitted based on the backup request signal, the second control means memorizes the number of times the data have been formulated based on the same backup request signal without completing transmission of such data, and decides not to repeat formulation of such data if the number of times exceeds a predetermined number of times and eliminates such backup request signal from the memory device.

5. The transmitter device as in claim 3, wherein:
   under a situation where the second control means formulates the data to be transmitted based on the backup request signal, the second control means memorizes a period of time lapsed from a previous formulation of the data to be transmitted based on the same backup request signal without completing transmission of such data, and decides not to formulate such data if the period of time exceeds a predetermined period of time and eliminates such backup request signal from the memory device.

6. A method of transmitting data from a transmitter to a receiver, the method comprising steps of:
   inputting a request signal to the transmitter;
   formulating data to be transmitted based on the request signal;
   memorizing the request signal as a backup request signal;
   transmitting the formulated data to the receiver;

eliminating the backup request signal if transmission of the data is completed;

formulating data to be transmitted, upon reactivation of the transmitter, based on the backup request signal if the backup request signal is still memorized; and transmitting the data formulated based on the backup request signal to the receiver.

* * * * *